United States Patent [19]

Brasier

[11] Patent Number: 5,387,277
[45] Date of Patent: Feb. 7, 1995

[54] PROCESS FOR THE RECOVERY OF AN ACID GAS FROM A GASEOUS STREAM CONTAINING ACID GAS

[75] Inventor: Robert S. Brasier, Mount Prospect, Ill.

[73] Assignee: UOP, Des Plaines, Ill.

[21] Appl. No.: 158,321

[22] Filed: Nov. 29, 1993

[51] Int. Cl.$^6$ .............................................. B01D 53/00
[52] U.S. Cl. ............................ 95/159; 95/187; 95/228; 95/230; 95/233; 95/259; 95/263
[58] Field of Search ............... 95/149, 156, 159, 187, 95/199, 210, 223, 228, 229, 233, 230, 237, 258, 259, 263; 55/220; 96/181, 202

[56] References Cited

U.S. PATENT DOCUMENTS

| | | | |
|---|---|---|---|
| 1,563,732 | 12/1925 | Egleson | 95/233 |
| 1,977,992 | 10/1934 | Hochschwender et al. | 95/223 |
| 2,318,752 | 5/1943 | Carney | 95/187 |
| 2,342,838 | 2/1944 | Brunjes | 95/199 |
| 2,345,696 | 4/1944 | Benning et al. | 95/233 |
| 3,948,622 | 4/1976 | Tsao | 95/229 |
| 4,488,884 | 12/1984 | Parigi | 95/233 |
| 4,895,995 | 1/1990 | James, Jr. et al. | 585/310 |

FOREIGN PATENT DOCUMENTS 730960 3/1966 Canada ................................. 95/223

*Primary Examiner*—Charles S. Bushey
*Attorney, Agent, or Firm*—Thomas K. McBride; John G. Tolomei; John G. Cutts, Jr.

[57] ABSTRACT

A process for removing a water-soluble acid gas from a gaseous stream containing normally gaseous hydrocarbon compounds, hydrogen and the acid gas to produce an aqueous solution containing the dissolved acid gas and having a very low level of normally gaseous hydrocarbon compounds. The gaseous feed stream is contacted with a lean aqueous stream to remove water-soluble acid gas. The resulting acid gas rich aqueous stream is stripped with a hydrogen-rich gas to produce an aqueous stream containing dissolved acid gas and essentially no normally gaseous hydrocarbon compounds.

6 Claims, 1 Drawing Sheet

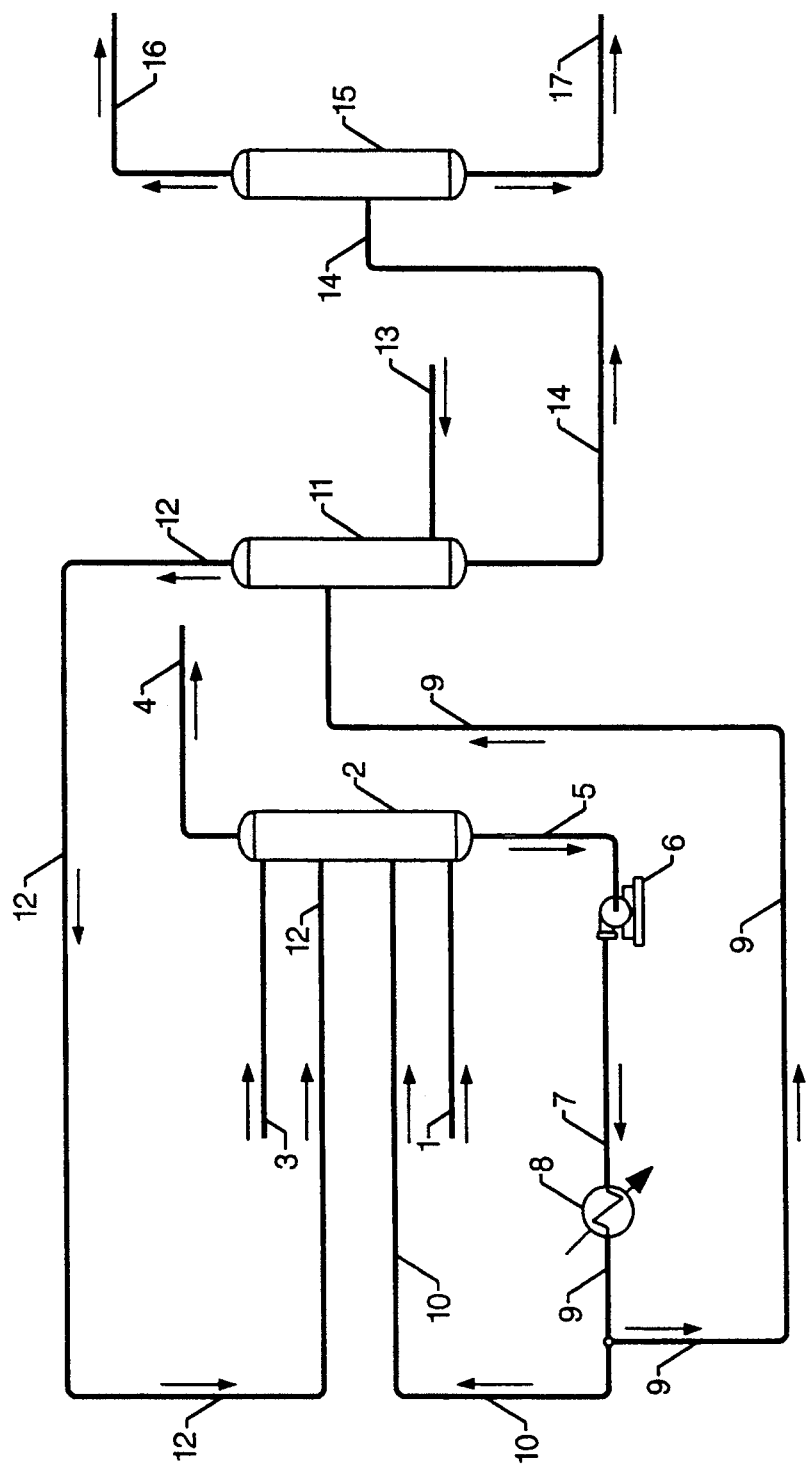

5,387,277

PROCESS FOR THE RECOVERY OF AN ACID GAS FROM A GASEOUS STREAM CONTAINING ACID GAS

BACKGROUND OF THE INVENTION

The field of art to which this invention pertains is the removal and recovery of an add gas from a gaseous stream containing acid gas. More specifically, the invention is directed to a process for the recovery of an acid gas in an aqueous solution having low concentrations of hydrocarbonaceous compounds.

In the fields of petroleum and petrochemical processing and manufacturing, there are many flowing gaseous streams which must be handled and processed to produce intermediate as well as final products and to separate and recover by-products and waste streams in order to provide safe disposal and/or recycle of such streams.

INFORMATION DISCLOSURE

In U.S. Pat. No. 4,895,995 (James, Jr. et al), a process is disclosed wherein the effluent from a hydrogenation zone comprising hydrogenated hydrocarbonaceous compounds, residual trace quantities of halogenated organic compounds, a hydrogen-rich gas and at least one water-soluble hydrogen halide compound is contacted with a halide-lean absorber solution in an absorption zone.

BRIEF SUMMARY OF THE INVENTION

The invention provides a process for recovering a water-soluble acid gas from a gaseous stream containing normally gaseous hydrocarbon compounds, hydrogen and the acid gas to produce an aqueous solution containing the dissolved acid gas and having a very low level of normally gaseous hydrocarbon compounds.

One embodiment of the invention may be characterized as a process for the recovery of an acid gas from a gaseous stream containing a normally gaseous hydrocarbon, hydrogen and the acid gas which process comprises: (a) contacting the gaseous stream with a lean aqueous solution in an absorption zone to produce a first stream comprising normally gaseous hydrocarbons, hydrogen and having a reduced concentration of acid gas; (b) recovering a first rich aqueous solution comprising at least a portion of the acid gas, normally gaseous hydrocarbon and hydrogen from the absorption zone; (c) contacting at least a portion of the rich aqueous solution resulting from step (b) with a hydrogen-rich gaseous stream to selectively strip at least a portion of the normally gaseous hydrocarbons from the rich aqueous solution to produce a hydrogen-rich gaseous stream containing normally gaseous hydrocarbons and a second rich aqueous solution comprising acid gas and having a reduced concentration of normally gaseous hydrocarbons; (d) introducing at least a portion of the hydrogen-rich gaseous stream containing normally gaseous hydrocarbons recovered in step (c) into the absorption zone in step (a); and (e) recovering the second rich aqueous solution comprising acid gas and having a reduced concentration of normally gaseous hydrocarbons produced in step (c).

Another embodiment of the invention may be characterized as a process for the recovery of an acid gas from a gaseous stream containing a normally gaseous hydrocarbon, hydrogen and the add gas which process comprises: (a) contacting the gaseous stream with a lean aqueous solution in an absorption zone to produce a first stream comprising normally gaseous hydrocarbons, hydrogen and having a reduced concentration of acid gas; (b) recovering a first rich aqueous solution comprising at least a portion of the acid gas, normally gaseous hydrocarbon and hydrogen from the absorption zone; (c) contacting at least a portion of the rich aqueous solution resulting from step (b) with a hydrogen-rich gaseous stream to selectively strip at least a portion of the normally gaseous hydrocarbons from the rich aqueous solution to produce a hydrogen-rich gaseous stream containing normally gaseous hydrocarbons and a second rich aqueous solution comprising acid gas and having a reduced concentration of normally gaseous hydrocarbons; (d) introducing at least a portion of the hydrogen-rich gaseous stream containing normally gaseous hydrocarbons recovered in step (c) into the absorption zone in step (a); (e) recovering the second rich aqueous solution comprising acid gas and having a reduced concentration of normally gaseous hydrocarbons produced in step (c); and (f) cooling and recycling at least a portion of the first rich aqueous solution comprising at least a portion of the acid gas from the gaseous stream to the absorption zone to thereby provide heat removal from the absorption zone.

BRIEF DESCRIPTION OF THE DRAWING

The drawing is a simplified process flow diagram of a preferred embodiment of the present invention.

DETAILED DESCRIPTION OF THE INVENTION

In order to achieve the maximum versatility for the use of the aqueous solution of the acid gas, the concentration of the normally gaseous hydrocarbon is preferably less than about 100 weight ppm and more preferably less than about 10 weight ppm. The desired aqueous stream containing an acid gas is preferably produced from a gaseous stream containing a normally gaseous hydrocarbon, hydrogen and the acid gas. It is contemplated that the gaseous stream contains from about 10 to about 60 volume percent normally gaseous hydrocarbon compounds, from about 20 to about 70 volume percent hydrogen and from about 1 to about 10 volume percent water-soluble acid gas.

The feed gas for the present invention preferably contains a water-soluble acid gas selected from the group consisting of hydrogen chloride, hydrogen fluoride and hydrogen bromide. The feed gas preferably contains a normally gaseous hydrocarbon selected from the group consisting of methane, ethane, propane and butane.

A contemplated source for the gaseous stream containing a normally gaseous hydrocarbon, hydrogen and an acid gas is the reactor effluent from a hydrogenation process which is used to convert halogenated organic compounds to produce hydrocarbons and acid gases. A suitable gaseous stream for the feed to the process of the present invention is preferably provided at a pressure in the range from about 10 psig to about 100 psig and a temperature in the range from about 70° F. to about 180° F.

A suitable gaseous stream is fed to the bottom of an absorption zone which in one embodiment is a packed absorber column and a lean aqueous solution of an acid gas which is typically the acid gas which is present in the feed gas is introduced at the top of the absorption zone and absorbs the acid gas which is contained in the feed gas preferably resulting in a greater than 99% recovery, of the acid gas present in the feed gas. The lean aqueous solution of an acid gas preferably contains from about 0.1 to about 20 weight percent acid gas.

The off-gas from the absorption zone comprises normally gaseous hydrocarbons and hydrogen with a reduced concentration of acid gas. The resulting aqueous solution which is rich in absorbed acid gas is removed from the bottom of the absorption zone and is preferably cooled. This rich aqueous solution preferably contains from about 15 to about 35 weight percent acid gas. The resulting cooled aqueous solution is split in a preferred embodiment of the present invention and a first portion is introduced into the absorption zone to provide heat removal for the absorption zone and a second portion is introduced into an acid gas stripping column to remove dissolved normally gaseous hydrocarbons. Hydrogen or a hydrogen-rich gaseous stream is introduced into the stripping column to serve as the stripping medium and the resulting gas stream from the stripping column contains hydrogen and acid gas which is introduced into the absorption zone in order to maximize the recovery of the acid gas.

The resulting liquid stream from the stripper is an aqueous solution containing acid gas and minor amounts of dissolved hydrogen, and is essentially free of normally gaseous hydrocarbons. In one embodiment, this resulting liquid stream is then introduced into a degassing drum to flash off dissolved hydrogen.

The absorption zone is preferably operated at conditions which include a pressure from about 10 psig to about 100 psig and a temperature from about 100° F. to about 200° F. The acid gas stripping column is preferably operated at nearly the same pressure as the absorption zone and at a temperature in the range from about 70° F. to about 180° F. The degassing drum is preferably operated at conditions which include a pressure from about atmospheric pressure to about 50 psig and a temperature from about 70° F. to about 120° F.

In the drawing, the process of the present invention is illustrated by means of a simplified flow diagram in which such details as total number of vessels, pumps, instrumentation, heat exchange and heat-recovery circuits, compressors and similar hardware have been deleted as being non-essential to an understanding of the techniques involved. The use of such miscellaneous equipment is well within the purview of one skilled in the art.

DETAILED DESCRIPTION OF THE DRAWING

With reference now to the drawing, a gaseous feed stream containing a normal gaseous hydrocarbon, hydrogen and an acid gas is introduced into the process via conduit 1 and enters absorption zone 2 wherein the gaseous feed stream is contacted with a lean aqueous solution containing an acid gas and which is introduced via conduit 3. An off-gas stream containing a reduced concentration of acid gas is removed from absorption zone 2 via conduit 4 and is recovered. Preferably, this resulting off-gas stream is essentially free of acid gas. An aqueous liquid bottoms stream rich in acid gas is removed from absorption zone 2 via conduit 5, pumped by means of pump 6, passed through conduit 7 and subsequently cooled in heat-exchanger 8. A portion of the resulting cooled liquid bottoms stream is recycled to absorption zone 2 via conduit 9 and conduit 10. Another portion of the resulting cooled liquid bottoms stream is transported via conduit 9 and is introduced into stripping zone 11. A hydrogen-rich stripping gas is introduced into stripping zone 11 via conduit 13. A gaseous overhead stream is removed from stripping zone 11 via conduit 12 and is introduced into absorption zone 2 via conduit 12. A liquid bottoms stream is removed from stripper zone 11 via conduit 14 and is introduced into a degassing zone 15 which is maintained at a pressure lower than the pressure maintained in stripper zone 11 in order to liberate trace quantities of hydrogen from the acid gas rich aqueous solution. The trace quantities of dissolved hydrogen are removed from degassing zone 15 via conduit 16 and recovered. An aqueous solution of acid gas which contains essentially no normally gaseous hydrocarbon compounds or hydrogen is removed from degassing zone 15 via conduit 17 and recovered.

The following illustrative embodiment is presented for the purpose of further illustrating the process of the present invention and to indicate the benefits afforded by the utilization thereof to recover a water-soluble acid gas from a gaseous stream containing normally gaseous hydrocarbon compounds, hydrogen and the acid gas and to produce an aqueous solution containing the dissolved acid and having a very low level of normally gaseous hydrocarbon compounds.

ILLUSTRATIVE EMBODIMENT

A gaseous stream containing a normally gaseous hydrocarbon, hydrogen and an acid gas in an amount of 100 mass units per hour and having the characteristics presented in Table 1 is introduced into an absorption zone and intimately contacted with a lean aqueous solution in an amount of 47 mass units per hour containing hydrogen chloride and having the characteristics presented in Table 1.

An absorber off-gas is removed from the absorption zone in an amount of about 95 mass units per hour and having the characteristics presented in Table 1. A liquid bottoms stream is removed from the absorption zone in an amount of 232 mass units per hour and having the characteristics presented in Table 1. This resulting liquid bottoms stream is cooled to a temperature of about 100° F. and split into a first stream of about 180 mass units per hour which is recycled to the absorption zone and a second stream of about 52 mass units per hour which is introduced into a stripping zone maintained at a pressure of about 40 psig and contacted with a hydrogen stripping stream in an amount of 0.2 mass units per hour.

A gaseous overhead stream containing greater than 99% hydrogen and trace quantities of water, hydrogen chloride and propane is removed from the stripper in an amount of about 0.2 mass units per hour and recycled to the absorption zone.

A liquid bottoms stream is removed from the stripper which stream is an aqueous solution of hydrogen chloride (29 weight percent) containing trace quantities of dissolved hydrogen. This resulting aqueous solution of hydrogen chloride is introduced into a degassing drum which is maintained at a pressure of about 5 psig in order to liberate the trace quantities of hydrogen and to produce an aqueous solution of hydrogen chloride which contains essentially no normally gaseous hydrocarbon compounds or hydrogen.

TABLE 1

| Component, Mol, % | Gas Feed | Lean HCl | Absorber Off-Gas | Absorber Bottoms Stream |
|---|---|---|---|---|
| $H_2O$ | 0.2 | 90.7 | 2.8 | 82.5 |
| $C_3H_7Cl$ | Nil | 0 | Nil | Nil |
| $C_3H_8$ | 40.4 | 0 | 40.7 | Nil |
| HCl | 4.5 | 9.3 | Nil | 17.5 |
| $CH_4$ | 0.8 | 0 | 0.7 | Nil |
| $H_2$ | 54.1 | 0 | 55.8 | Nil |

The foregoing description and Illustrative Embodiment clearly illustrate the advantages encompassed by the method of the present invention and the benefits to be afforded with the use thereof.

What is claimed:

1. A process for the recovery of an acid gas from a gaseous stream containing a normally gaseous hydrocarbon, hydrogen and said acid gas which process comprises:
   (a) contacting said gaseous stream with a lean aqueous solution in an absorption zone to produce a first stream comprising normally gaseous hydrocarbons, hydrogen and having a reduced concentration of acid gas;
   (b) recovering a first rich aqueous solution comprising at least a portion of said acid gas, normally gaseous hydrocarbon and hydrogen from said absorption zone;
   (c) contacting at least a portion of said rich aqueous solution resulting from step (b) with a hydrogen-rich gaseous stream to selectively strip at least a portion of said normally gaseous hydrocarbons from said rich aqueous solution to produce a hydrogen-rich gaseous stream containing normally gaseous hydrocarbons and a second rich aqueous solution comprising acid gas and having a reduced concentration of normally gaseous hydrocarbons;
   (d) introducing at least a portion of said hydrogen-rich gaseous stream containing normally gaseous hydrocarbons recovered in step (c) into said absorption zone in step (a); and
   (e) recovering said second rich aqueous solution comprising acid gas and having a reduced concentration of normally gaseous hydrocarbons produced in step (c).

2. The process of claim 1 wherein at least a portion of said first rich aqueous solution comprising at least a portion of the acid gas from said gaseous stream is cooled and recycled to said absorption zone to thereby provide heat removal from said absorption zone.

3. The process of claim 1 wherein said gaseous stream containing a normally gaseous hydrocarbon, hydrogen and acid gas contains from about 10 to about 60 volume percent normally gaseous hydrocarbon compounds, from about 20 to about 70 volume percent hydrogen and from about 1 to about 10 volume percent acid gas.

4. The process of claim 1 wherein said lean aqueous solution contains from about 0.1 to about 20 weight percent acid gas.

5. The process of claim 1 wherein said absorption zone is operated at conditions which include a pressure from about 10 psig to about 100 psig and a temperature from about 100° F. to about 200° F.

6. The process of claim 1 wherein said second rich aqueous solution comprising acid gas contains from about 15 to about 35 weight percent acid gas.

* * * * *